UNITED STATES PATENT OFFICE.

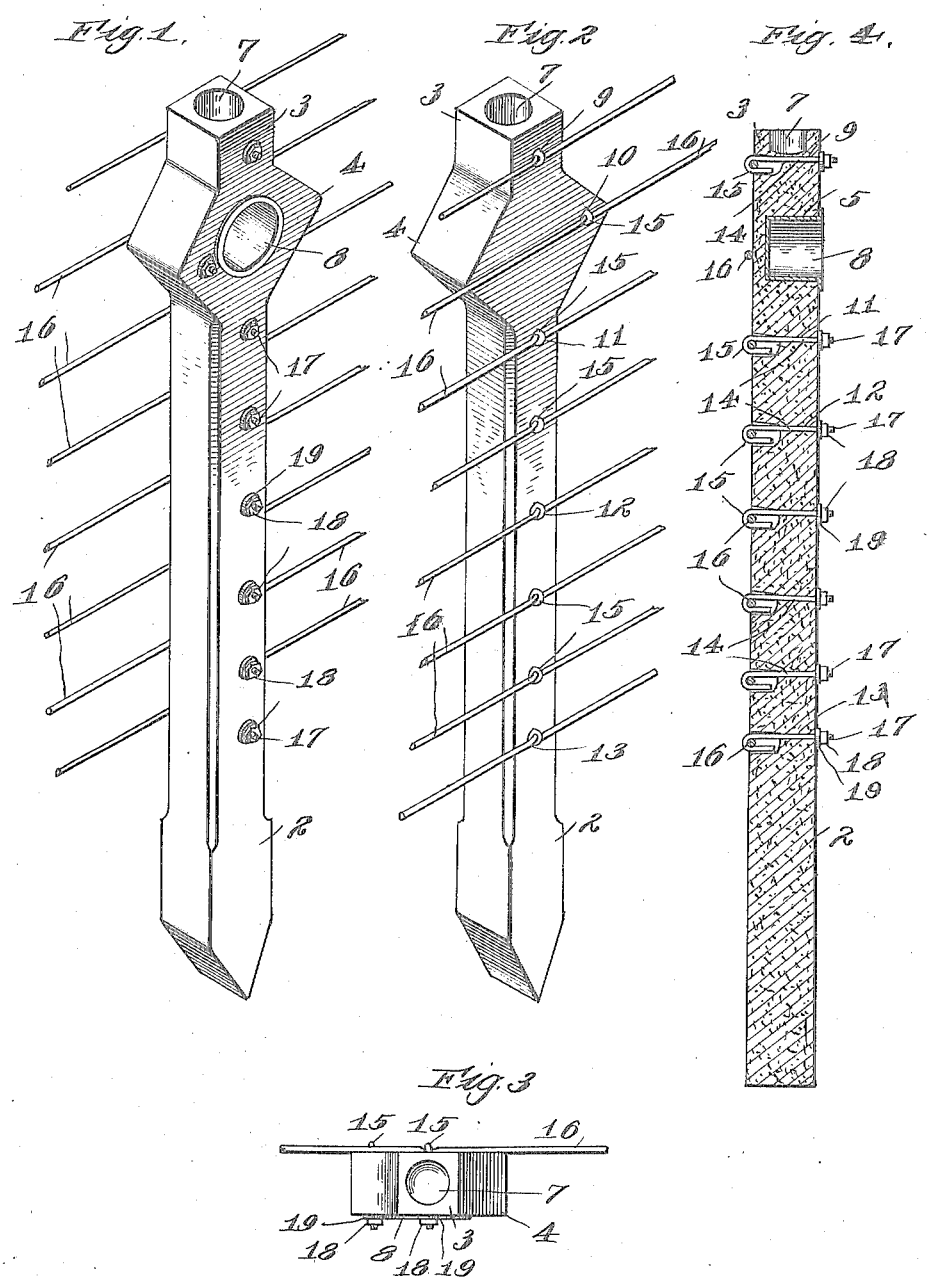

L ANDREW NELSON, OF FOSS, WISCONSIN.

FENCE-POST.

947,929.     Specification of Letters Patent.     Patented Feb. 1, 1910.

Application filed June 10, 1909. Serial No. 501,276.

*To all whom it may concern:*

Be it known that I, L ANDREW NELSON, a citizen of the United States, residing at Foss, Wisconsin, have invented certain new and useful Improvements in Fence-Posts, of which the following is a specification.

My invention relates to fence posts and has particular reference to such posts molded from concrete and other plastic material.

The object of the invention is to provide a fence post which in addition to its usual function of protecting the farmers' fields against trespassing animals, also protects said fields by encouraging the little birds to come to the fields and destroy various forms of insect life that are injurious to the husbandman's trees, fruits and crops.

I accomplish the foregoing object and the further object of gaining for the toilers on treeless fields the inspiring, uplifting and encouraging companionship of the singing "angels of the air", by providing a fence-post which serves as a refuge, harbor, home and drinking fountain for a family of birds. The fence-posts studding the boundaries of a field in large numbers will, accordingly, furnish a large number of homes for the birds and in a large measure take the place of boundary trees used as fence-posts as harboring places for birds.

With the above-named general objects in view my invention consists in the novel construction of fence-post, its combinations and arrangements of parts, all as hereinafter described in detail, illustrated in the drawing and incorporated in the appended claims.

In the drawing—Figure 1 is a perspective view of a fence-post embodying my invention, and showing the birds' nest side of the post facing the interior of the field. Fig. 2 is a similar view showing the outer side of the post. Fig. 3 is a top plan view and Fig. 4 is a vertical section.

In the several views 2 represents the lower end of the post which is tapered to facilitate its insertion in a post-hole, 3 is the upper end of the post and 4 is an intermediate widened portion near the top of the post. The part 4 is the house or nest portion of the post, and same is provided with a cavity 5 suitable as a place for a birds' nest or shelter for birds. This portion is shown with sloping surfaces 6 in imitation of the roof of a house. The crown portion 3 rising above the top of the birds' home is provided with a cavity 7 of a size that will contain about a pint of water and of an interior form corresponding substantially to an ordinary drinking-cup. This cavity is designed to catch rain water and retain a supply of drinking water for the birds for a longer or shorter period between rains. By making this provision the birds will not be compelled to leave the fields for distant points to seek shelter or water, will be encouraged to make the neighborhood their home and to propagate their species. They will be comparatively safe from attack by cats and other prowling animals whose claws can get no hold upon the surface of a cement post.

In practice I cement in a tin can 8 which serves to mold the opening 5 and is left there permanently to keep the nest dry or to obviate the usual dampness of cement walls. The inner surface of this can may be coated with paint of suitably attractive color, and this will prevent its rusting when ordinary tin cans are used as empty cans may be obtained very cheaply.

Passing transversely through the post at suitable distances apart are a series of holes or bores 9, 10, 11, 12 and 13 in which bolts 14 are inserted. These bolts have each a hooked portion 15 adapted to engage a fence wire 16, and a threaded portion 17 provided with a nut 18. The outer end of each hole, or the end adjacent to the wire 16 is enlarged so as to admit the whole hook 15, which enables me not only to clamp the wire tightly against the post but gives the hook, after it is in place in the post, the appearance of an ordinary barbed wire fence staple. The nuts 18 engage the inner side of the post where they can not be conveniently tampered with from the outside. These bolts afford a very convenient means of attaching wires or railings to the posts in such a manner that they can be removed and renewed without damaging the post itself in the least. Washers 19 are preferably interposed between the nut and the post.

From the foregoing description the nature and scope of my invention will be readily understood, and, obviously, the precise form and arrangement herein shown may be varied in numerous ways without departing from the spirit of my invention.

Having thus described my invention, I claim as new and desire to secure by Letters Patent—

1. The combination with a fence-post of a widened portion having a birds' nest cavity therein, a water-proof lining for said cavity, and a drink receptacle in the top of said post which is adapted to collect water from rains.

2. A cement fence-post having a tapered lower end, and an enlarged crown portion having an open drink receptacle therein adapted to collect drops of rain, and a birds' nest cavity provided with a tin lining in said enlarged portion.

3. A fence-post having bolt-holes therethrough, the bird sheltering cavity in the side of said post, a watering cup in the top thereof, the bolts having the hooked portions 15 adapted to engage fence-wires 16, said bolt holes being enlarged at one end to receive said hooked portion, as and for the purposes specified.

In testimony whereof I have hereunto set my hand in the presence of two subscribing witnesses.

L ANDREW NELSON.

In presence of—
 H. R. ALLEN,
 CHAS. J. KINZEL.